United States Patent
Liu et al.

(10) Patent No.: US 10,622,604 B2
(45) Date of Patent: Apr. 14, 2020

(54) INTEGRATED BATTERY MODULES IN ELECTRIC VEHICLES

(71) Applicant: SF Motors, Inc., Santa Clara, CA (US)

(72) Inventors: Ying Liu, Santa Clara, CA (US); Derek Nathan Wong, Santa Clara, CA (US); Chien-Fan Chen, Santa Clara, CA (US); Yifan Tang, Santa Clara, CA (US)

(73) Assignee: SF Motors, Inc., Santa Clara, CA (US)

( * ) Notice: Subject to any disclaimer, the term of this patent is extended or adjusted under 35 U.S.C. 154(b) by 121 days.

(21) Appl. No.: 16/008,892

(22) Filed: Jun. 14, 2018

(65) Prior Publication Data

US 2019/0296282 A1   Sep. 26, 2019

Related U.S. Application Data

(60) Provisional application No. 62/646,973, filed on Mar. 23, 2018.

(51) Int. Cl.
| | |
|---|---|
| *H01M 4/02* | (2006.01) |
| *H01M 2/10* | (2006.01) |
| *H01M 2/04* | (2006.01) |
| *H01M 10/04* | (2006.01) |

(52) U.S. Cl.
CPC .......... *H01M 2/1077* (2013.01); *H01M 2/04* (2013.01); *H01M 2/1083* (2013.01); *H01M 10/045* (2013.01); *H01M 10/0413* (2013.01)

(58) Field of Classification Search
CPC ....................................................... H01M 4/02
See application file for complete search history.

(56) References Cited

U.S. PATENT DOCUMENTS

| | | | |
|---|---|---|---|
| 6,423,441 B1 * | 7/2002 | Ronning | H01M 2/202 361/748 |
| 2013/0252071 A1 | 9/2013 | Teramoto et al. | |
| 2017/0214103 A1 | 7/2017 | Onnerud et al. | |

OTHER PUBLICATIONS

Non-Final Office Action on U.S. Appl. No. 16/228,948 dated Jan. 29, 2019.
Notice of Allowance on U.S. Appl. No. 16/228,948 dated May 22, 2019.

* cited by examiner

*Primary Examiner* — Jacob B Marks
(74) *Attorney, Agent, or Firm* — Foley & Lardner LLP; James De Vellis

(57) ABSTRACT

Provided herein are battery packs for electric vehicles. A battery pack can include a housing having cavities. The battery pack can include electrode structures having a first tab terminal and a second tab terminal. A cover can be disposed over the housing. The cover can include first junction connectors extending between a first surface of the cover and a second surface of the cover. The first tab terminal of each electrode structure can be welded to respective first junction connectors.

20 Claims, 8 Drawing Sheets

INTEGRATED BATTERY MODULES IN ELECTRIC VEHICLES

RELATED APPLICATION

The present application claims the benefit of priority under 35 U.S.C. § 119(e) to U.S. Provisional Application 62/646,973, filed on Mar. 23, 2018, titled "INTEGRATED BATTERY CELL MODULE," which is incorporated herein by reference in its entirety.

BACKGROUND

Batteries can include electrochemical cells to supply electrical power to various electrical components connected thereto. Such batteries can be installed in a vehicle such as an automobile to provide electrical energy to various electrical systems installed within the vehicle.

SUMMARY

The present disclosure is directed to battery modules for battery packs in electrical vehicles. The disclosed battery modules can have battery cells including both a positive terminal and a negative terminal on either side of the battery cells. Such a configuration can allow for improvement in protection of the constituent component within the battery cell and for faster assembly time during the battery pack assembly process.

At least one aspect is directed to a battery module for electric vehicles. The battery module can include a housing having a length, a width and a height, a first surface of the housing defining a plurality of openings to a plurality of cavities extending along the height of the housing. The battery module also includes a plurality of electrode structures positioned within the plurality of cavities, each electrode structure including a first tab terminal and a second tab terminal. The battery module further includes a cover having a length equal to the length of the housing, and a width equal the width of the housing, the cover disposed over the first surface of the housing, the cover including a plurality of first junction connectors extending along a height of the cover between a first surface of the cover and an opposing second surface of the cover, the plurality of first junction connectors welded to respective first tab terminals of the plurality of electrode structures.

At least one aspect is directed to a method of providing battery packs for electric vehicles. The method can include forming a housing having a length, width and a height, a first surface of the housing defining a plurality of openings to a plurality of cavities extending along the height of the housing. The method can further include positioning a plurality of electrode structures within the plurality of cavities, each electrode structure including a first tab terminal and a second tab terminal. The method can include disposing a cover having a length equal to the length of the housing, and a width equal to the width of the housing, over the first surface of the housing, the cover including a plurality of first junction connectors extending along a height of the cover between a first surface of the cover and an opposing second surface of the cover, the plurality of first junction connectors welded to respective first tab terminals of the plurality of electrode structures.

At least one aspect is directed to a method of supplying battery packs for electric vehicles. The method can include providing a battery module. The battery module includes a housing having a length, a width and a height, a first surface of the housing defining a plurality of openings to a plurality of cavities extending along the height of the housing. The battery pack can include a plurality of electrode structures positioned within the plurality of cavities, each electrode structure including a first tab terminal and a second tab terminal. The battery pack further includes a cover having a length equal to the length of the housing, and having a width equal to the width of the housing, the cover disposed over the first surface of the housing, the cover including a plurality of first junction connectors extending along a height of the cover between a first surface of the cover and an opposing second surface of the cover, the plurality of first junction connectors welded to respective first tab terminals of the plurality of electrode structures.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
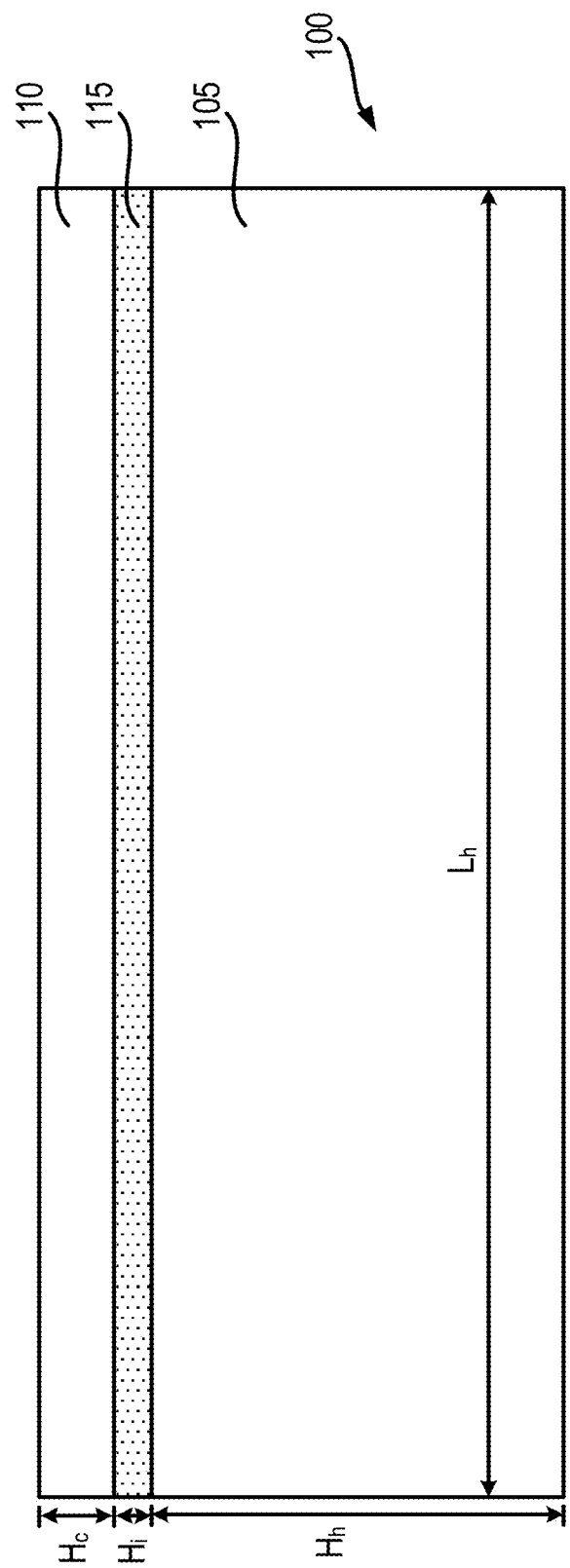
FIG. 1 illustrates a side view of an integrated battery module.

Following below are more detailed descriptions of various concepts related to, and implementations of battery cells for battery packs in electric vehicles. The various concepts introduced above and discussed in greater detail below can be implemented in any of numerous ways.

Described herein are battery modules that can be included in battery packs for use in electric vehicles for an automotive configuration. An automotive configuration includes a configuration, arrangement or network of electrical, electronic, mechanical or electromechanical devices within a vehicle of any type. An automotive configuration can include battery packs for electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned.

A battery module can include battery cells having positive and negative terminals. Each battery cell can include a can or container containing an electrode structure (sometimes referred to herein as a jelly roll), which includes an anode and a cathode and separator material interposed between the anode and the cathode. An electrolyte can be added to the electrode structure. The electrolyte can serve as a catalyst by promoting the movement of ions from the cathode to the anode. The electrolytes can include liquids, gels, or dry polymers. The battery cells can include a battery cap attached to the can or container that safely encloses the electrode structure and the electrolyte. The battery cap can serve as one of two cell terminals (positive and negative), and can be connected to a anode or cathode tab terminal of the electrode structure. The container can serve as the second cell terminal and can be connected to the other of the anode and the cathode tab terminal of the electrode structure. The battery caps of two or more battery cells can be electrically connected to a first bus-bar by wire bonding. In a similar manner, the containers of the two or more battery cells can be electrically connected to a second bus-bar by wire bonding as well.

A battery cell having wire bonding connections with bus-bars can suffer from various drawbacks. For example, the wire bonding between the positive or the negative terminals and the respective bus bars can fail or break. One reason for the failure can be the small surface area available on the battery caps for bonding the wire. The small surface area can cause unreliable bonding between the battery cells and the wire. This failure can result in the battery cells being disconnected from the bus-bar, and causing undesired drop in the power provided by the battery pack. In addition, the small surface area can result in a relatively small contact area between the battery cap and the wire for wire bonding, thereby resulting in high resistance at the contact area as well as increasing the time necessary to manually (or otherwise) assemble the wire bond.

To address these and other technical drawbacks, the battery module and battery pack described herein can eliminate the need for wire bonding to make electrical contact between a bus-bar and the battery cell. Instead, the anode tabs or terminals of the electrode structure can be welded to junction connectors, which in turn are connected to bus bars, in the absence of a wire bond between the terminals and the bus bars. A battery module can house the electrode structures and electrolyte for the battery cells in cavities, eliminating the need for caps and containers for the battery cells. The electrode structure can include electrolyte material and can include cathode and anode tab terminals. One of the anode and the cathode tab terminals can be welded to junction connectors on a cover that covers and seals the housing. The junction connectors can be connected to a bus bar. By eliminating the wire bonding, and utilizing a weld instead, the reliability of the connection between the battery cell and the bus-bar is improved. Further, by eliminating the cap and the container of the battery cells, the weight of the battery module is reduced, and time and cost of manufacturing the battery module is reduced as well.

FIG. 1 depicts a side view of an example integrated battery module 100. The battery module 100 can include a housing 105 and a cover 110 disposed over the housing 105. By being disposed over the housing 105, the cover 110 can be directly coupled the housing 105, or indirectly coupled to the housing 105 via an intervening layer or material. For example, the integrated battery module 100 can include an insulation layer 115 positioned between at least a portion of the housing 105 and at least a portion of the cover 110. The housing 105 houses a number of battery cells including electrode structures and electrolytes, and the cover 110 covers the battery cells and provides connectivity to one or more bus bars. The bus bars can carry current to or from the battery cells. The housing 105 can have a rectangular profile in side view, as shown in FIG. 1. The housing 105 can have a profile different from that shown in the example of FIG. 1, such as square, oval, polygonal (regular or irregular), elliptical, or other shapes. The cover 110 can cover a first surface 125 of the housing 105 that defines openings to cavities in which battery cells are formed (shown in the example of FIG. 3). The shape of the cover 110 can conform to the shape of the first surface 125 of the housing 105. The dimensions of the cover 110 can be similar or conformed to the dimensions of the first surface of the housing 105.

The insulation layer 115 can be positioned between the first surface of the housing 105 and the cover 110. The insulation layer 115 can provide electrical and heat insulation between the cover 110 and the housing 105. Additionally, the insulation layer 115 can provide a seal between the cover 110 and the housing 105, thereby sealing the battery cells positioned in the housing 105. The seal can contain gaseous build-up within the battery module, up to at least a defined pressure threshold between 250 psi and 400 psi. The seal can contain the gaseous build-up without using vents to reduce pressure build up within the battery module. The insulation layer 115 can be formed along the periphery of the housing 105 and the cover 110. The insulation layer 115 can be positioned discontinuously along the periphery of the housing 105 and the cover 110. That is, portions of the periphery of the housing 105 and the cover 110 can be separated by air, instead of by the insulation layer 115. The discontinuities can vent gases that can be produced during the electrochemical process of the battery module 100. The battery module 100 can be devoid of the insulation layer 115. For example, the cover 110 can be positioned directly on the first surface 125 of the housing 105 without the intervening insulation layer 115. In such instances, the cover 110 and the housing 105 can be insulators or include an insulating layer integrated within the cover 110 or the housing 105 to avoid a short circuit between positive and negative terminals of the battery module 100. The battery module 100 can be sealed with a sealant applied at locations where the edges of the cover 110 meet the edges of the housing 105.

As an example, the housing 105 can have a length $L_h$, and a height $H_h$, where $L_h$ can have a value between 175 millimeter (mm) and 200 mm and the height $H_h$ can be between 80 mm and 100 mm. In one example, the length $L_h$ can be greater than the height $H_h$ of the housing 105. The thickness or height $H_1$ of the insulation layer 115 can be between 1 mm and 5 mm. The thickness or height of the cover 110 can be between 4 mm and 10 mm. The lengths of the cover 110, the insulation layer 115, and the housing 105 can be the same. For example, the common length can be between 175 mm and 200 mm. The lengths or widths of the cover 110, the insulation layer 115 and the housing 105 can be different to accommodate various packaging and installation scenarios. A periphery of the cover 110 can be flush with a periphery of the housing 105, as shown in FIG. 1. That is, a length and width of the cover 110 can be the same as a length and width, respectively, of the first surface 125 of the housing 105. However, this is only an example, and the length or width of the cover 110 can be different from the length and width of the first surface 125 of the housing 105.

The housing 105 can be formed from electrically insulating materials such as plastics and polymers, or other electrically insulating or non-conductive material. The housing 105 can include materials such as metals (e.g., stainless steel, Aluminum), for example, to improve the strength and structural stability of the housing 105. The housing 105 can be formed using thermally conducting materials, to conduct and transfer heat generated by the electrode structures (e.g., within each battery cell). The housing 105 can include insulation material positioned between walls of the cavities and the electrode structure and electrolyte to provide electrical insulation between battery cells. The cover 110 can be formed using materials similar to those discussed above in relation to the housing 105. The insulation layer 115 can include materials such as epoxy and glass that can not only provide heat and electric insulation, but also seal the gap between the housing 105 and the cover 110.

Figure 2:
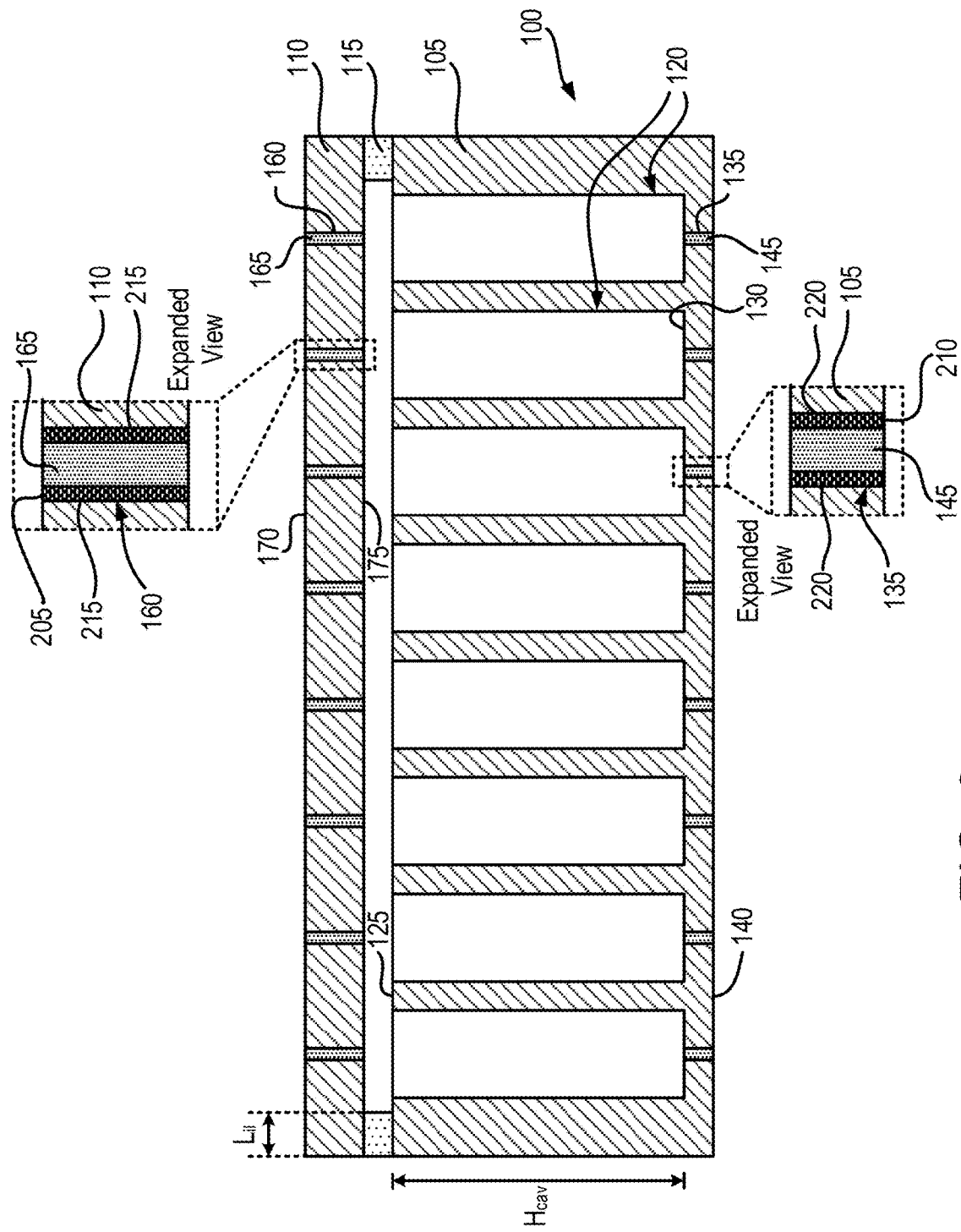
FIG. 2 illustrates a cross-sectional view of an example battery module.

FIG. 2 depicts a cross-sectional view of an example battery module 100. In this example, FIG. 2 shows the battery module 100 without any electrode structures or electrolyte. The housing 105 includes several cavities 120 that extend from a first surface 125 of the housing 105. While not visible in FIG. 2, the first surface 125 of the housing 105 defines several openings, each of which corresponds to one of the cavities 120. Each cavity 120 extends into the housing from its respective opening to its respective cavity base surface 130 at a depth indicated by $H_{cav}$, which is less than the height $H_h$ of the housing 105. The cavities 120 can have the same depth. In another example, at least one of the cavities 120 can have a depth that is different from the depth of another one of the cavities 120. Cavities with different depths can accommodate electrode structures of different sizes. The cavity base surface 130 can be planar (e.g. +/−10 degrees) and can be parallel (e.g., +/−10 degrees) to a second surface 140 of the housing, where the second surface 140 of the housing 105 opposes the first surface 125 of the housing 105. That is, the second surface 140 of the housing 105 can face in a direction opposite to the direction in which the first surface 125 of the housing 105 faces. The second surface 140 of the housing 105 can be parallel to the first surface 125 of the housing 105, or can have an angle (e.g., +/−15 degrees) with the first surface 125 of the housing 105. In some examples, the cavity base surface 130 can be in a plane that forms an angle (e.g., +/−15 degrees) with the plane of the second surface 140 of the housing 105. In some examples, the cavity base surface 130 may not be planar, and instead have a cup shape to provide additional stability to the electrode structure. The housing 105 can include second junction connector openings, also referred to herein as negative connector openings 135, that extend between the cavity base surfaces 130 and a second surface 140 of the housing 105. The negative connector openings 135 house second junction connectors. The second junction connectors can include negative junction connectors 145 that can be connected to cathode tab terminals of the electrode structures within the cavities 120 to one or more bus bars positioned on (or on the same side as) the second surface 140 of the housing 105. The negative junction connectors 145 can be welded to the bus bars on the second surface 140 of the housing 105. The electrical connection between the negative tab terminals of the electrode structures and the bus bars may not include any wire bonding. The negative connector openings 135 can extend between the cavity base surface 130 and the second surface 140 of the housing 105 in a direction that is normal to the second surface 140 of the housing 105. The negative connector openings 135 can extend at an angle (e.g., +/−15 degrees) with the normal. The negative connector openings 135 can be positioned at a center of the cavity base surface 130. In some examples, the negative connector openings 135 can be positioned offset from the center of the cavity base surface 130. In some examples, the negative connector opening 135 can align with the position of the negative tab terminal of the electrode structure housed in the cavity 120

The cover 110 can include several first junction connector openings, also referred to herein as positive connector openings 160, that extend between a first surface 170 of the cover 110 and a second surface 175 of the cover 110. The positive connector openings 160 can extend between the first surface 170 and the second surface 175 of the cover 110 in a direction that is normal to the first surface 170 and the second surface 175 of the cover 110. In some examples, the positive connector openings 160 can extend at an angle (e.g., +/−15) to the normal. Each of the positive connector openings 160 can house a first junction connector. The first junction connector can include a positive junction connector 165. The positive junction connectors 165 can be electrically connected with first tab terminals of electrode structures positioned in the cavities 120. The first tab terminals can include cathode tab terminals or positive tab terminals of the electrode structures. The number of positive junction connectors 165 can be equal to the number of cavities 120. In addition, the positive junction connectors 165 can be positioned on the cover 110 such that when the cover 110 is placed over the housing 105, the positive junction connectors 165 are aligned with the corresponding cavities 120 in the housing 105. The first surface 170 of the cover 110 can oppose the second surface 175 of the cover 110. That is, the first surface 170 of the cover 110 can face in a direction that is opposite to the direction in which the second surface 175 of the cover 110 faces. For example, the second surface 175 of the cover faces toward the housing 105, while the first surface 170 of the cover 110 faces away from the housing 105. The first surface 170 of the cover 110 can be parallel to the second surface 175 of the cover 110. The first surface 170 of the cover 110 can be at an angle with the second surface 175 of the cover 110 (e.g., +/−15 degrees).

The positive junction connector 165 can be insulated from the inner surfaces of the positive connector opening 160. For example, the positive connector opening 160 can include a first insulating material 205 on its sidewalls 215 such that first insulating material 205 separates the sidewalls 215 from the positive junction connector 165. The first insulating material can be beneficial in reducing the risk of electrically shorting the positive junction connector 165 where the cover 110 includes electrically conductive materials. The first insulating material 205 can be present discontinuously between the sidewalls 215 of the positive connector opening 160 and the positive junction connector 165, such that a portion of the sidewalls 215 and the positive junction connector 165 are separated by air instead of the first insulating material 205. The first insulating material 205 can include materials such as plastic, polymers, glass, or other insulating materials. The negative junction connector 145 can be insulated from the inner surfaces of the negative connector opening 135. For example, the negative connector opening 135 can include a second insulting material 210 on its sidewalls 220 such that that second insulating material 210 separates the sidewalls 220 from the negative junction connector 145. The second insulating material 210 can be beneficial in reducing the risk of electrically shorting the negative junction connector 145 where the housing 105 includes electrically conductive materials. The second insulating material 210 can be present discontinuously between the sidewalls 220 of the negative connector opening 135 and the negative junction connector 145, such that a portion of the sidewalls 220 and the negative junction connector 145 are separated by air instead of the second insulating material 210. The second insulating material 210 can include materials such as plastic, polymers, glass, or other insulating materials.

The insulation layer 115 can be positioned between second surface 175 of the cover 110 and the first surface 125 of the housing 105 along the peripheries of the cover 110 and the housing 105. The insulation layer 115 can be directly coupled to both the second surface 175 of the cover 110 and the first surface 125 of the housing 105. The insulation layer 115 can extend inwards from the periphery of at least one of the housing 105 or the cover 110 by a distance indicated by $L_{il}$ in FIG. 2. The distance $L_{il}$ can be equal to between 1 mm and 4 mm. The insulation layer 115 can be positioned along locations further inward from the peripheries of the cover 110 and the housing 105 than that shown in FIG. 2. The insulation layer 115 can be continuous or can include disjoint portions.

Figure 3:
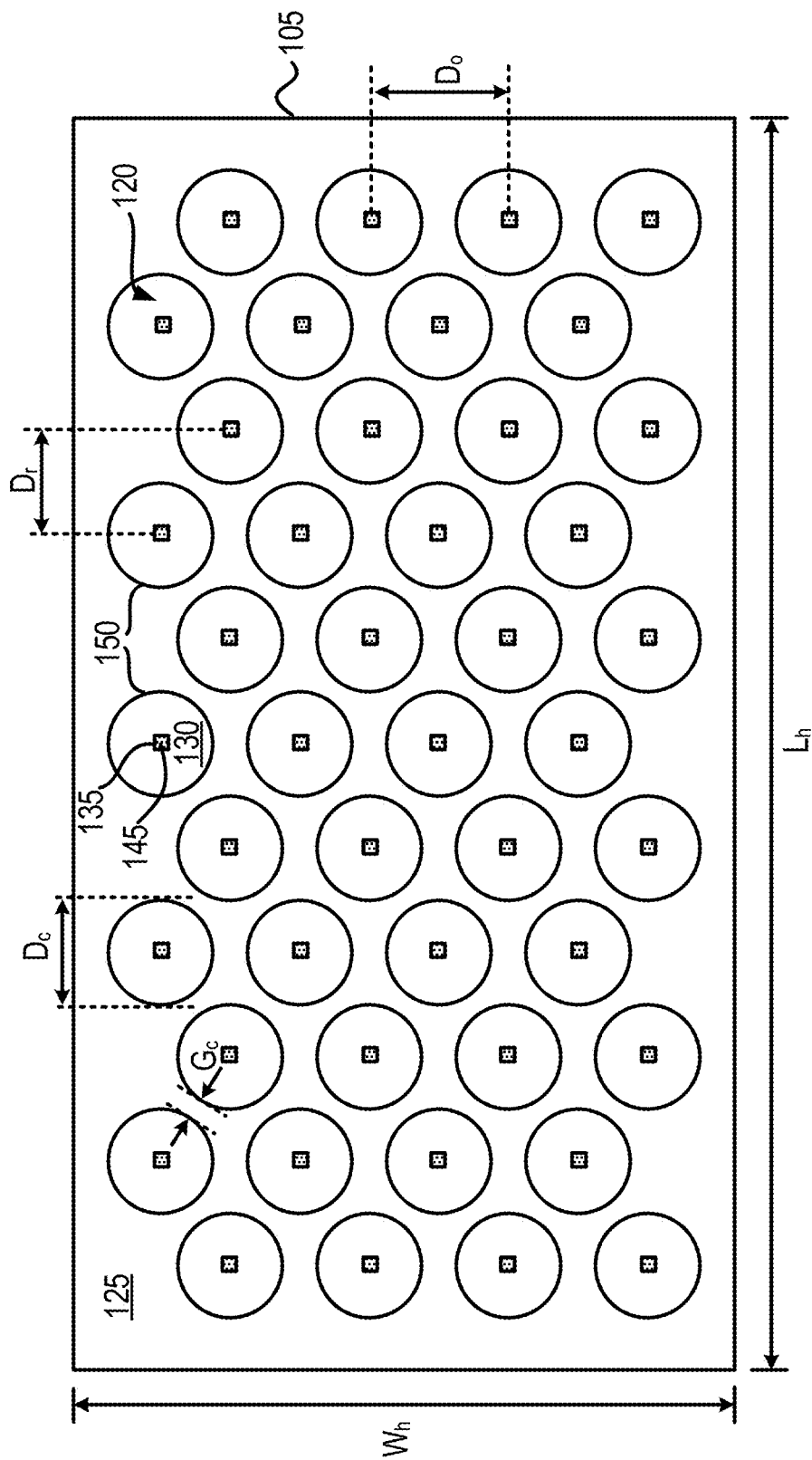
FIG. 3 illustrates a top view of an example housing of a battery module.

FIG. 3 depicts a top view of an example housing 105 of a battery module 100. In this example, FIG. 3 shows the first surface 125 of the housing 105 defining openings 150 of the cavities 120 shown in FIG. 2. In addition, FIG. 3 shows the cavity base surface 130, which defines the negative connector opening 135, which houses the negative junction connector 145. The negative connector opening 135 can be positioned near the center of the cavity base surface 130, such as, for example, within 10% of the diameter of the cavity base surface 130. In some examples, the negative connector opening 135 can be positioned offset from the center anywhere on the cavity base surface 130. For example, negative connector opening 135 can be positioned to align with the negative tab terminal of the electrode structure positioned in the cavity 120. The negative connector opening 135 or the negative junction connector 145 can have a rectangular shape, as shown in FIG. 3. Their shapes can be other than rectangular, such as, for example, circular, elliptical, and polygonal (regular or irregular). Their shapes can conform to the shape of the negative tab terminal of the electrode structure. Example width of the negative connector opening 135 can be between 2 mm and 8 mm. Example length of the negative connector opening 135 can be between 4 mm and 10 mm.

The openings 150 can have a diameter $D_c$ in the plane of the first surface 125 of the housing 105. As an example, the diameter $D_c$ can be between 19 mm and 20 mm. While FIG. 3 shows the openings 150, and the corresponding cavities, to have a circular shape within the plane of the first surface 125 of the housing 105, the openings 150 can have a different shape, such as, for example, elliptical, oblong, and polygonal (regular or irregular). The shape and size of the openings 150 can conform to the shape and size of the electrode structures to be housed in the cavities 120. For example, if the shape of the electrode structure is elliptical, the shape of the openings 150 can be elliptical, with dimensions that are greater than the corresponding dimensions of the electrode structure. The dimensions of the openings, and therefore the cross-sectional dimensions of the cavities 120, can be sized to be greater than the corresponding dimension of the electrode structure by 1 mm to 3 mm, or 2 mm. A gap (195, FIG. 4) between the cavity 120 and the electrode structure (180, FIG. 4) can be filled with an electrolyte. In some instances, the openings 150 can be sized such that they conform to the dimensions of their respective electrode structures (180, FIG. 4). That is, there is no gap, or a gap of 0 mm, between the inner surface of the cavities 120 and the electrode structure (180, FIG. 4). In this manner, the electrode structures can snugly fit within the cavities 120 and can be held in place by the friction between the outer surfaces of the electrode structures (180, FIG. 4) and the inner surfaces of the cavities 120. This can allow retaining the electrode structures (180, FIG. 4) safely within the cavities 120 and reduce the risk of egress of the electrode structures (180, FIG. 4) from the cavities during operation. As an example, the diameters of the cavities 120 can be equal to or slightly less than (say 0.5 mm to 1 mm) the diameter of their respective electrode structures (180, FIG. 4). While FIG. 3 shows all of the cavities 120 having the same shape and size, in some other examples, at least two cavities can have different shapes or sizes within the same housing 105.

The openings 150 and the corresponding cavities 120 can be arranged in a set of staggered rows as shown in FIG. 3. The openings 150 can be arranged in a grid like fashion. The staggered arrangement can allow for a larger number of cavities 120, compared to the grid arrangement, within a given surface area of the first surface 125 of the housing 105. In another example, the openings 150 can be arranged in an irregular pattern over the first surface 125 of the housing 105. Adjacent rows of openings 150 can be spaced apart by a distance $D_r$, measured between the respective centers of two openings 150 in adjacent rows. In some examples, the rows can be closely packed, such that $D_r$ is less than a diameter of the openings 150. In some examples, the distance $D_r$ can have a value between 10 mm and 15 mm. While FIG. 3 shows four openings 150 per row, and 11 rows, in some examples, a different number of openings per row, and a different number of rows can be used. Two adjacent openings 150 within a single row can be separated by a distance $D_o$, measured between the respective centers of the two openings 150 in the same row. In some examples, the distance $D_o$ can have values between 22 mm and 25 mm. The openings 150 can have a diameter D, which can have a value between 19 mm and 22 mm (or, for example a value such as 21 mm to house an electrode structure similar to that used in a 21700 cell). The openings 150, and the corresponding cavities 120 within the housing 105, can be separated by a gap $G_c$, which can have a value between 0.8 mm and 1.5 mm (or, for example, a values such as 1.2 mm). The housing 105 can provide electrical and heat insulation to battery cells formed in each cavity 120 from the battery cells in one or more adjacent cavities 120. To provide adequate insulation (e.g., creepage-clearance requirements of a corresponding battery module or battery pack), the gap $G_c$ between adjacent openings 150 can be at least 0.8 mm.

The insulation layer 115 (FIGS. 1 and 2) can be positioned on the first surface 125 of the housing 105 along the periphery of the hosing 105. Referring to FIG. 3, the insulation layer 115 can be positioned on the first surface 125 of the housing 105 such that the insulation layer 115 covers the entire first surface 125 of the housing 105, other than where the openings 150 are formed. That is, the insulation layer 115 can cover the first surface 125 of the housing 105 along the periphery of the housing 105 as well as the gaps between the openings 150. This can provide sealing of individual cavities 120 corresponding to the openings 150. The insulation layer 115 can cover only a portion, and not the entirety of, the first surface 125 of the housing 105. For example, the insulation layer 115 can cover only the periphery of the first surface 125 of the housing 105.

Figure 4:
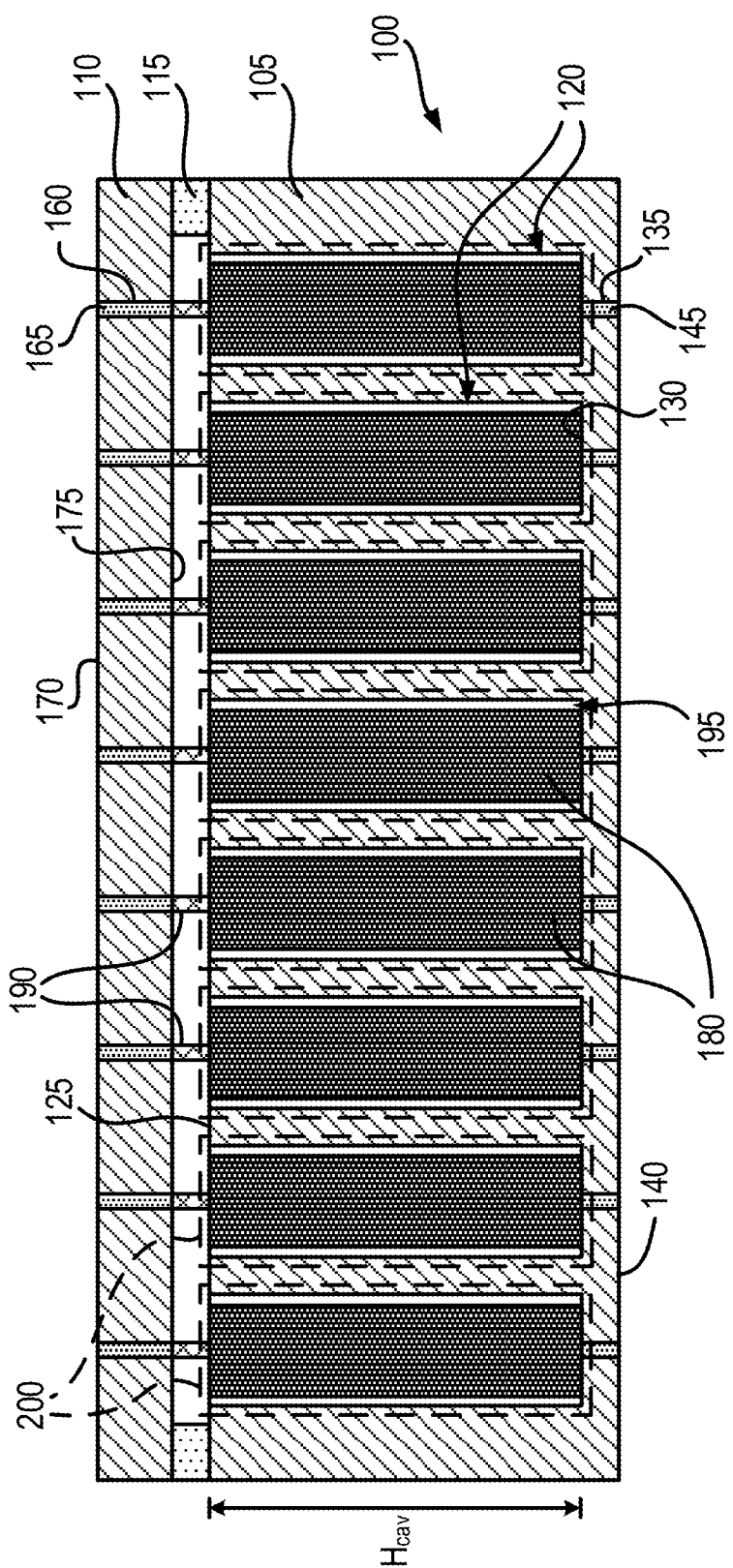
FIG. 4 illustrates a cross-sectional view of an example battery module.

FIG. 4 depicts a cross-sectional view of an example battery module 100, including electrode structures 180. Each cavity 120 in the housing 105 can include one electrode structure 180. Each cavity 120, in addition to the electrode structure 180, can include electrolyte. The electrode structure 180 and the electrolyte in combination with the corresponding cavity 120, form a battery cell 200. Unlike battery cells that include a metal container and an individual cap to enclose the electrode structure and the electrolyte, the battery cells 200 formed in the housing 105 do not include a metal container and a cap. By eliminating the container and the cap from the battery cells 200 in the battery module 100, the battery module 100 can have reduced weight, reduced cost, and reduced manufacturing time relative to a battery cell configuration that includes the container and the individual cap. The electrode structure 180 can include an anode and a cathode. As one example, the electrode structure 180 can include a jelly roll type electrode structure. Electrode structures other than a jelly roll can be used. For example, electrode structures such as a stacked electrode structure, in which the anode, the cathode, and the separator are arranged in individual alternating plates, can be utilized. The electrode structure can include a rolled stack of sheets of a cathode, a separator, and an anode. The stack of sheets can be rolled into a cylindrical electrode structure for instance, which can be inserted into the cavity 120. In one example, the cathode sheet can include aluminum, and the anode sheet can include copper. Each anode and cathode sheet can include a tab terminal that extends outwardly from, for instance along a longitudinal axis of, the electrode structure. For example, FIG. 4, among others, shows a first tab terminal, also referred to herein as a positive tab terminal 190, extending from one end of the electrode structure 180. The electrode structure 180 may include a second tab terminal extending from the opposite end of the electrode structure 180. The second tab terminal can include a negative tab terminal of the electrode structure.

The positive tab terminal 190 can be welded to the corresponding positive junction connector 165, and the negative tab terminal can be welded to the corresponding negative junction connector 145. Welding the positive and negative tabs or terminal to their corresponding positive and negative junction connectors can eliminate the need for wire bonding as an approach for providing an electrical connection. Welds can be structurally stronger than wire bonds, and, therefore, can be relatively more reliable. As a result, the electrical connections between the electrode structures and the junction connectors are relatively more reliable than wire bonding. In one example, the positive tab terminal 190 can include conductive materials such as aluminum, while the negative tab can include conductive material such as copper. In other examples, other conductive materials may also be used. The positive junction connector 165 can include the same material as the positive tab terminal 190. Similarly, the negative junction connectors 145 can include the same materials as the negative tab terminal. Using the same material for the junction connectors and their respective tabs or terminals can provide stronger welded connections than when dissimilar materials are used. The welding can be carried out using various welding techniques such as, for example, ultrasonic welding, spot welding, and laser welding. The welded connections may not include materials other than those included in the tab terminals and the junction connectors. For example, the weld connection between the positive tab terminal 190 and the positive junction connector 165 may not include materials, such as a solder, in addition to those included in the positive tab terminal 190 and the positive junction connector 165. Similarly, the weld connection between the negative tab terminal and the negative junction connector 145 may not include materials other than those included in the negative tab terminal and the negative junction connector 145.

In some examples, the electrode structure 180 can be positioned within the cavity 120 such that the negative tab terminal, instead of the positive tab terminal 190 is positioned near the opening 150 and the cover 110. The cover 110 can then include negative junction connectors in place of positive junction connectors 165, and the housing 105 can include positive junction connectors instead of negative junction connectors 145. The negative tab terminals can then be welded to the negative junction connectors in the cover, and the positive tab terminals can be welded to the positive junction connectors in the housing 105. In one example, all the electrode structures 180 can be positioned in the same orientation (i.e., positive tab terminal near the opening 150 and the negative tab terminal near the cavity base surface 130, or positive tab terminal near the cavity base surface 130 and the negative tab terminal near the opening 150). In some examples, at least one electrode structure 180 can be positioned in an orientation that is opposite to the orientation of another electrode structure 180). In such examples, at least two bus bars (at least one for positive voltage connection and at least one for negative voltage connection) can be positioned on the second surface 140 of the housing, and at least two bus bars can be positioned on the first surface 170 of the cover 110.

Figure 5:
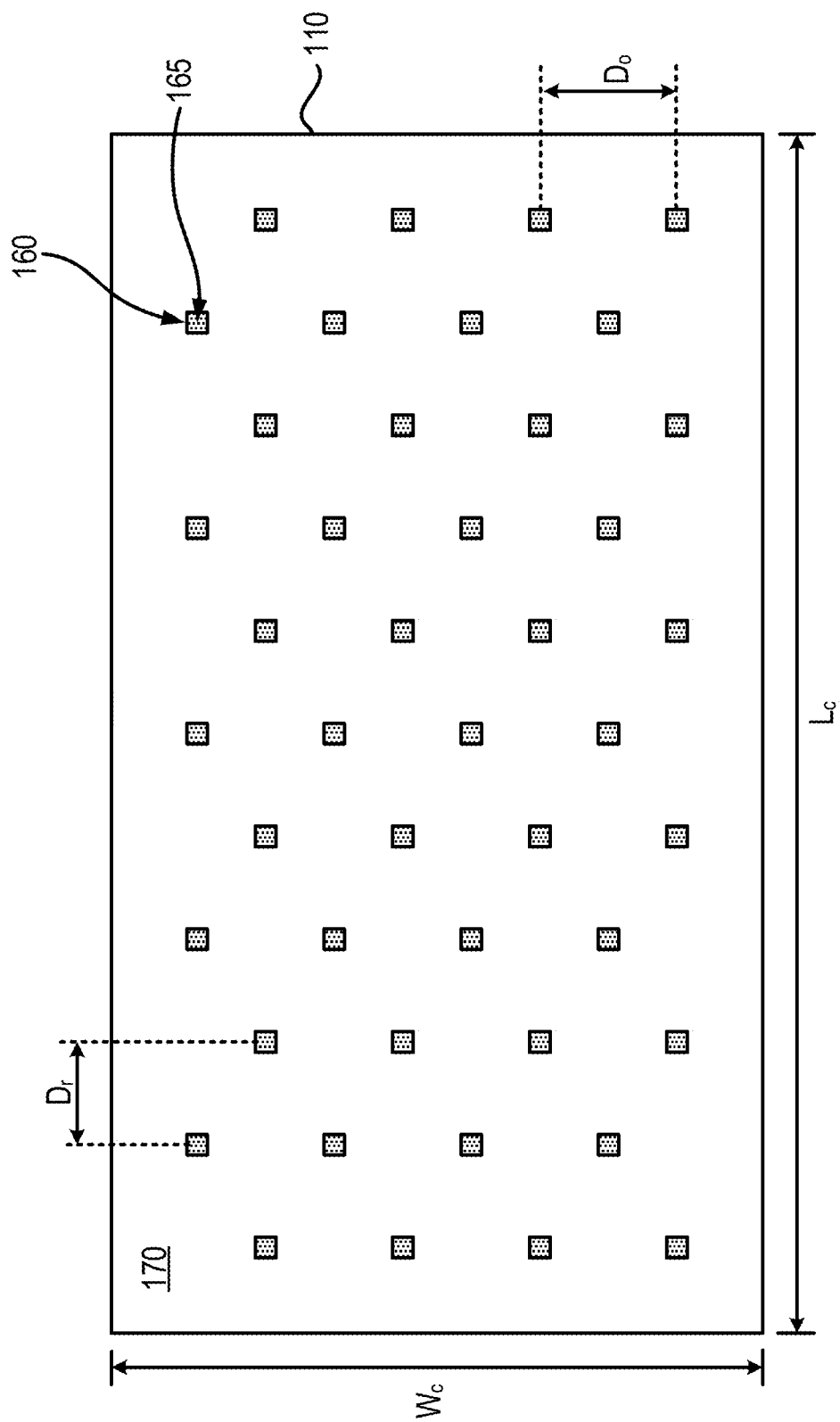
FIG. 5 illustrates a plan view of an example cover of an example battery module.

FIG. 5 depicts a plan view of a cover 110 of a battery module 100. In this example, FIG. 5 shows the arrangement of the positive connector openings 160 and the positive junction connectors 165. The positive connector openings 160 and the positive junction connectors shown in FIG. 5 each has a rectangular shape within the plane of the first surface 170 of the cover 110. However, other shapes, such as, for example, circular, elliptical, oval, or polygonal (regular or irregular) can be employed. The cover 110 can have a length $L_c$ and a width $W_c$, which in some examples can be equal to the length $L_h$ and the width $W_h$ of the housing 105. The length $L_c$ or the width $W_c$ of the cover can be different from the length $L_h$ or the width $W_h$ of the housing 105. The positive connector openings 160 are arranged in multiple rows in a staggered pattern. The arrangement of the positive connector openings 160 and the positive junction connectors 165 can be similar to the arrangement of the cavities 120 in the housing 105, or the arrangement of the positive tab terminals 190 (e.g., shown in FIG. 4). However, other arrangements and patterns are possible. In some examples, the number of rows of positive connector openings 160, and the number of positive connector openings 160 in each row can be equal to the number of rows of cavities 120 (or openings 150) and the number of cavities (or openings 150) in each row. For example, as shown in FIG. 3, the housing 105 includes four openings 150 per row, and eleven rows in total. Similarly, referring to FIG. 5, the cover 110 includes four positive connector openings 160 per row, and eleven rows in total. In some examples, the number of positive connector openings 160 and the total number of rows of positive connector openings 160 can be different than that shown in FIG. 5. Two adjacent rows of positive connector openings 160 can be separated by a distance $D_r$. The distance $D_r$, can be same as the distance between two adjacent rows of openings 150 on the housing 105 (FIG. 3). Two adjacent positive connector openings 160 in the same row can be separated by a distance $D_o$. In some examples, the distance $D_o$ can be same as the distance between centers of two openings 150 in the housing 105 (FIG. 3).

In one example, the positive junction connectors 165 can be removable from the positive connector openings 160.

This can allow flexibility in replacing faulty junction connectors, and allow repair of faulty welds to the positive tabs or terminals 190. Alternatively, the positive junction connectors 165 can be irremovably fixed in their respective positive connector openings 160. The ends of the positive junction connectors 165 that terminate near the first surface 170 of the cover 110 can be flush with the first surface 170. This can provide a smooth surface over which the positive bus bars can be installed. Alternatively, the positive junction connectors 165 can extend beyond the plane of the first surface 170 of the cover 110. This can provide additional surface area and height of the positive junction connectors 165 for making electrical connections with the positive bus bar. The positive junction connectors 165 can be connected to the bus bar using a solder or a weld. Thus, the electrical connection between the positive junction connectors 165 and the bus bar may not include any wire bonding. The positive junction connectors 165 can be insulated from the inner wall or sidewall of the positive connector openings 160. For example, an insulating material such as, for example, plastic or epoxy, can be positioned between the positive junction connector 165 and the inner surface of the positive connector opening 160. This can reduce the risk of short circuit in instances where the cover 110 includes conductive materials.

Figure 6:
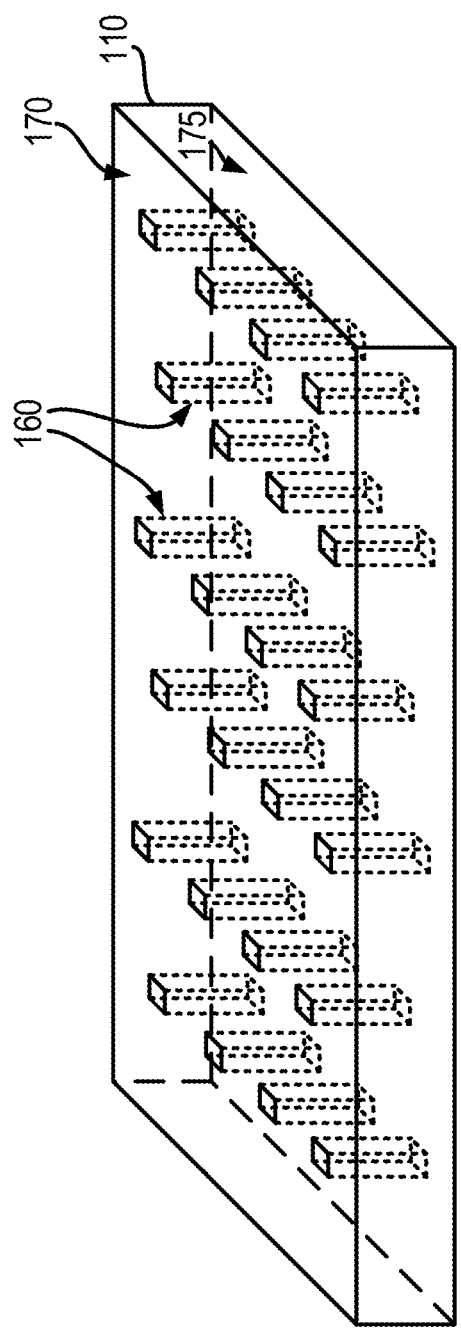
FIG. 6 illustrates an isometric view of a portion of an example cover of an example battery module.

FIG. 6 depicts an isometric view of a portion of an example cover 110 of a battery module 100. FIG. 6 shows multiple positive connector openings 160 that are configured to house positive junction connectors (e.g., 165, FIG. 5). The positive connector openings 160 can extend between the first surface 170 of the cover 110 and the second surface 175 of the cover 110.

Figure 7:
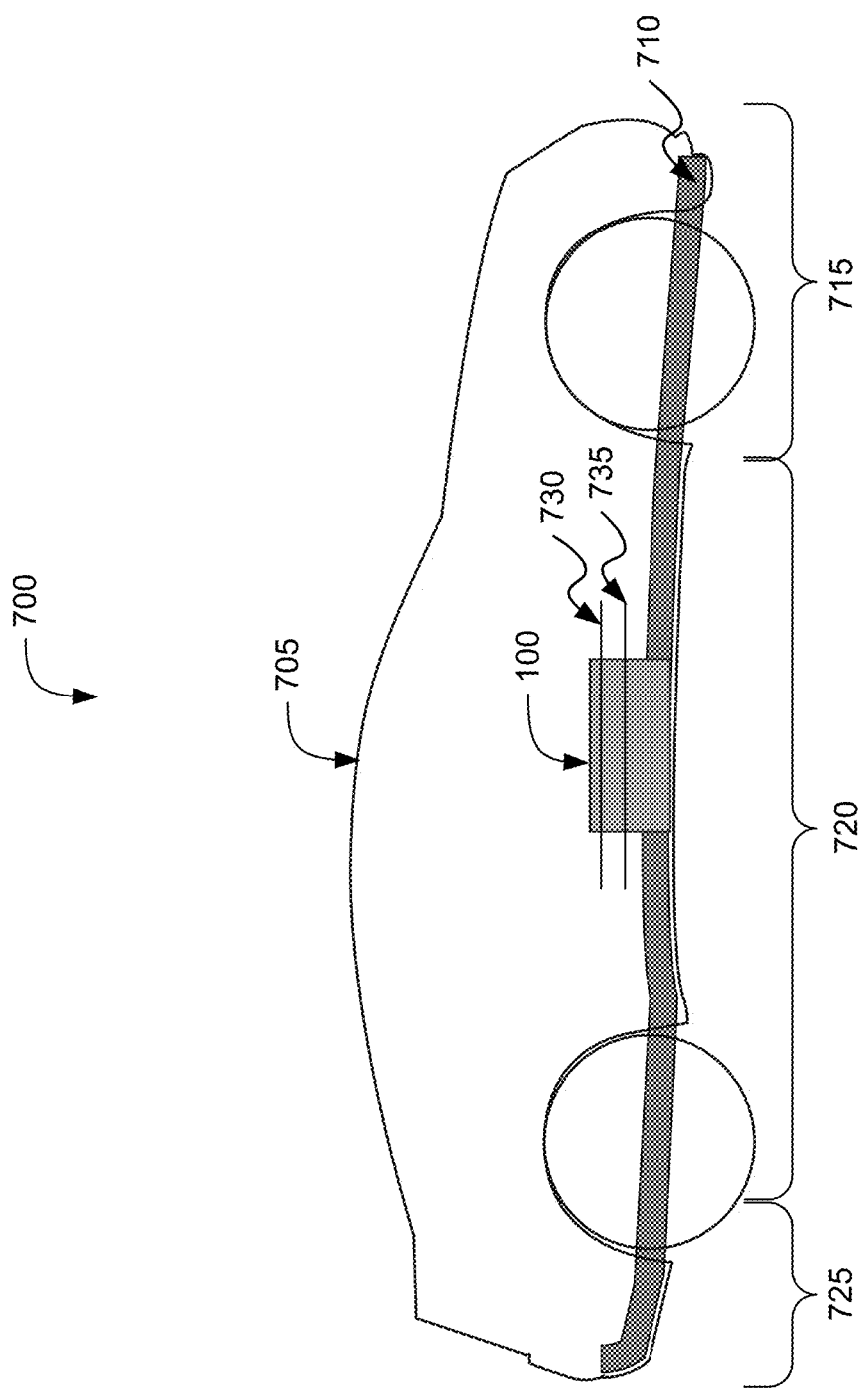
FIG. 7 is a block diagram depicting a cross-sectional view of an example electric vehicle installed with a battery pack.

FIG. 7 depicts a cross-section view 700 of an example electric vehicle 705 installed with a battery module 100. The electric vehicle 705 can include a chassis 710 (sometimes referred to herein as a frame, internal frame, or support structure). The chassis 710 can support various components of the electric vehicle 705. The chassis 710 can span a front portion 715 (sometimes referred to herein a hood or bonnet portion), a body portion 720, and a rear portion 725 (sometimes referred to herein as a trunk portion) of the electric vehicle 705. The front portion 715 can extend between the front bumper and the front wheel well. The body portion 720 can extend between the front wheel well and the rear wheel well. The rear portion 725 can extend between the rear wheel well and the rear bumper. One or more battery modules 100 can be installed or placed within the electric vehicle 705. The battery module(s) 100 can be installed on the chassis 710 of the electric vehicle 705 within the front portion 715, the body portion 720 (as depicted in FIG. 7), or the rear portion 725. A first bus bar 730 and the second bus bar 735 can be connected or otherwise be electrically coupled to other electrical components of the electric vehicle 705 to provide electrical power. For example, the first bus bar can be electrically connected to the positive junction connectors 165 exposed on the first surface 170 of the cover 110 (FIG. 5), and the second bus bar can be electrically connected to the negative junction connectors 145 exposed on the second surface 140 of the housing 105. As a result, the positive tab terminals of one or more battery cells (FIG. 4, 200) can be connected to the first bus bar without including any wire bonding, and the negative tab terminals of one or more battery cells (FIG. 4, 200) can be connected to the second bus bar without any wire bonding. The firs bus bar and the second bus bar can provide a path for the flow of electrical current to flow to and from the battery cells.

Figure 8:
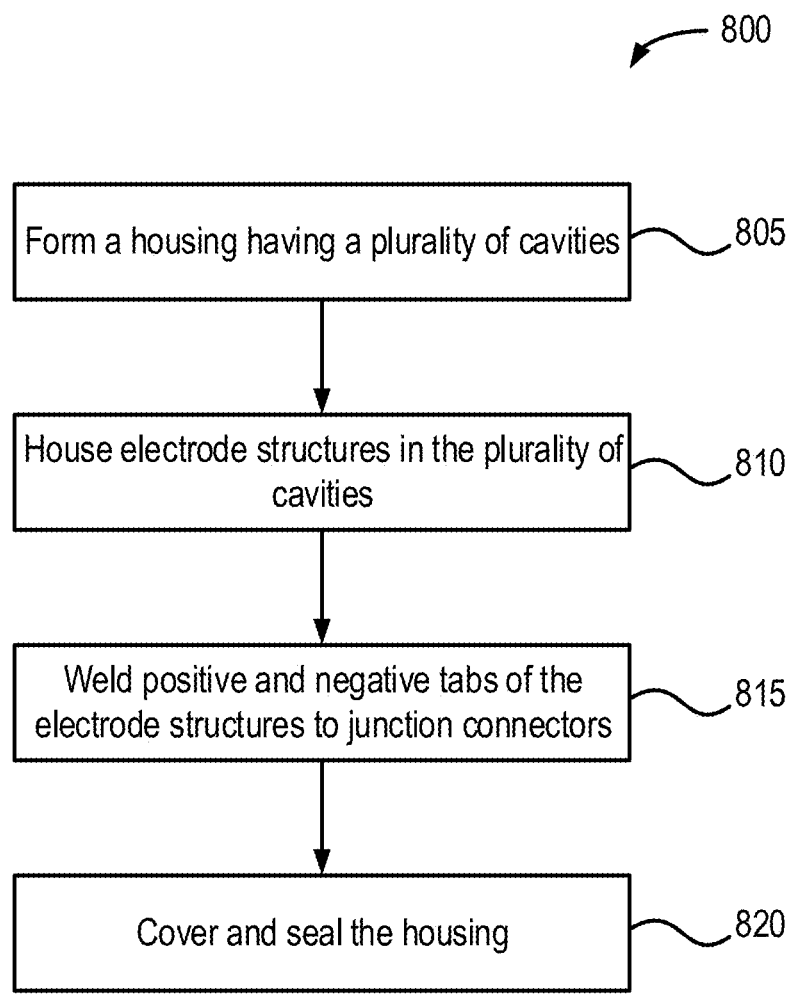
FIG. 8 is a flow diagram depicting an example method of providing battery modules for electric vehicles.

FIG. 8 depicts an example method 800 for providing battery modules for electric vehicles. In this example, the method 800 can include forming a housing having a plurality of cavities (ACT 805). For example, the housing 105 can be formed having the cavities 120. As an example, the housing 105 can be formed using a molding process, such as injection molding, blow molding, or compression molding, among other techniques, to form the cavities 120. As another example, the cavities 120 can be drilled into the first surface 125 of the housing 105. In addition, to forming the cavities 120, the negative connector openings 135 can be formed using a process similar to the molding or drilling process used for forming the cavities 120.

The method 800 can include housing or holding electrode structures in the plurality of cavities in the housing (ACT 810). The electrode structures 180 are inserted into the cavities 120. As an example, the insertion can be carried out by an automated pick and place machine. The electrode structures 180 can be inserted in a manner such that the end of the electrode structure having the negative tab or electrode is inserted first. As an example, an electrolyte can be provided within each of the plurality of cavities 120. A least a portion of an outer surface of an electrode structure 180 can be in physical contact with a wall of a corresponding cavity 120, which can provide a frictional effect to help maintain the electrode structure 180 in place within the corresponding cavity 120.

The method 800 can include welding positive and negative tabs of the electrode structures to junction connectors (ACT 815). For example, referring to FIG. 4, among others, the positive tab terminal 190 of the electrode structures 180 can be welded to the positive junction connectors 165. In addition, the negative tab terminal (not shown) can be welded to the negative junction connectors 145. In some instances, the negative tab terminals can be welded to the negative junction connectors 145 prior to welding the positive tab terminals to the positive junction connectors 165. Alternatively, the positive tab terminals can be welded to the positive junction connectors 165 prior to welding the negative tab terminals to the negative junction connectors 145. As an example, ultrasonic welding can be utilized to weld the tabs or terminals to the junction connectors. However, other welding techniques such as laser welding can be utilized. The shape and structure of the positive tab terminal 190 can be designed or configured to support or hold a corresponding electrode structure 180 in place within a corresponding cavity 120. For instance, the positive tab terminal 190 can incorporate a spring structure that applies a force transmitted from the cover 110 to press or hold the electrode structure 180 snugly against a corresponding cavity base surface 130.

The method 800 can include covering and sealing the housing (ACT 820). For example, FIGS. 1, 2, and 4 depict an example with the cover 110 disposed over the housing 105 and sealed using an insulation layer 115. Being disposed over can include the cover 110 being coupled to the housing 105 by an intervening insulation layer 115. Being disposed over can include the cover 110 being directly coupled to the housing 105 without the intervening insulation layer 115. As examples, glass or epoxy material can be used to form the insulation layer 115. The glass or epoxy in a molten or semi-solid fluidic state can be applied to the first surface 125 of the housing 105 or the second surface 175 of the cover 110. The cover 110 can then be positioned over the glass or epoxy. The glass or epoxy can then be allowed to cool and to form a seal around the interface between the cover 110 and the housing 105.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, planar, perpendicular, vertical or other positioning or orientation descriptions include variations within +/−10% or +/−10 degrees of pure vertical, planar, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery module of a battery pack for electric vehicles, the battery module comprising:
   a housing having a length, a width and a height, a first surface of the housing defining a plurality of openings to a plurality of cavities extending along the height of the housing;
   a plurality of electrode structures positioned within the plurality of cavities, each electrode structure including a first tab terminal and a second tab terminal; and
   a cover having a length equal to the length of the housing, and having a width equal to the width of the housing, the cover disposed over the first surface of the housing, the cover including a plurality of first junction connectors extending along a height of the cover between a first surface of the cover and an opposing second surface of the cover, the plurality of first junction connectors welded to respective first tab terminals of the plurality of electrode structures.

2. The battery module of claim 1, comprising:
   a plurality of second junction connectors extending between respective cavity base surfaces of the plurality of cavities and a second surface of the housing, the second surface of the housing opposing the first surface of the housing, the plurality of second junction connectors welded to respective second tab terminals of the plurality of electrode structures.

3. The battery module of claim 2, comprising:
a plurality of second junction connector openings extending between respective cavity base surfaces of the plurality of cavities and the second surface of the housing, the plurality of second junction connector openings housing the plurality of second junction connectors; and
a plurality insulating materials positioned in the plurality of second junction connector openings between sidewalls of the plurality of first junction connector openings and respective plurality of second junction connectors.

4. The battery module of claim 1, comprising:
a plurality of first junction connector openings extending between the first surface of the cover and the second surface of the cover, the plurality of first junction connector openings housing the plurality of first junction connectors; and
a plurality of insulating materials positioned in the plurality of first junction connector openings between sidewalls of the plurality of first junction connector openings and respective plurality of first junction connectors.

5. The battery module of claim 1, comprising:
a bus bar positioned on the first surface of the cover, the bus bar electrically connected, without wire bonding, to ends of at least two of the plurality of first junction connectors that are opposite to ends of the plurality of first junction connectors connected to respective at least two of the plurality of first tab terminals, the bus bar carrying electrical current between the at least two of the plurality of first junction connectors and an electrical vehicle.

6. The battery module of claim 1, comprising:
a plurality of second junction connectors extending between cavity base surfaces of the plurality of cavities and a second surface of the housing, the plurality of second junction connectors welded to respective second tab terminals; and
a bus bar positioned on a second surface of the housing, the bus bar electrically connected, without wire bonding, to ends of at least two of the plurality of second junction connectors that are opposite to ends of the plurality of second junction connectors connected to respective at least two of the plurality of second tab terminals, the bus bar carrying electrical current between the at least two of the plurality of second junction connectors and an electrical vehicle.

7. The battery module of claim 1, comprising:
an insulation layer positioned between at least a portion of the first surface of the housing and at least a portion of the second surface of the cover, the insulation layer positioned along at least a portion of a periphery of the first surface of the housing.

8. The battery module of claim 7, wherein the insulation layer includes glass.

9. The battery module of claim 7, wherein the insulation layer seals the cover to the housing.

10. The battery module of claim 1, wherein a diameter of at least one of the plurality of cavities is greater than a diameter of the corresponding at least one of the plurality of electrode structures.

11. The battery module of claim 1, wherein a gap between an inner surface of at least one cavity of the plurality of cavities and the corresponding electrolyte is between 0 millimeter (mm) and 1 mm.

12. The battery module of claim 1, wherein a number of the plurality of cavities is between 20 and 100.

13. The battery module of claim 1, wherein the plurality of openings on the first surface of the housing are at least one of: circular, rectangular, and oblong.

14. The battery module of claim 1, wherein a gap between the cover and the first surface of the housing is 1 millimeter (mm) to 5 mm.

15. The battery module of claim 1, comprising:
the plurality of first tab terminals extending between the plurality of electrode structures and respective plurality of junction connectors for a distance between 2 millimeter (mm) and 7 mm.

16. The battery module of claim 1, wherein a diameter of at least one of the plurality of cavities is unequal to another one of the plurality of cavities.

17. The battery module of claim 1, wherein at least two cavities of the plurality of cavities are separated by no more than 1.5 millimeter (mm).

18. A method of providing battery modules for battery packs of electric vehicles, comprising:
forming a housing having a length, width and a height, a first surface of the housing defining a plurality of openings to a plurality of cavities extending along the height of the housing;
positioning a plurality of electrode structures within the plurality of cavities, each electrode structure including a first tab terminal and a second tab terminal; and
disposing a cover having a length equal to the length of the housing, and a width equal to the width of the housing, over the first surface of the housing, the cover including a plurality of first junction connectors extending along a height of the cover between a first surface of the cover to and an opposing second surface of the cover, the plurality of first junction connectors welded to respective first tab terminals of the plurality of electrode structures.

19. The method of claim 18, comprising:
providing a plurality of second junction connectors extending between cavity base surfaces of the plurality of cavities and a second surface of the housing, the second surface of the housing opposing the first surface of the housing; and
welding the plurality of second junction connectors to respective second tab terminals of the plurality of electrode structures.

20. A method, comprising:
providing a battery module for a battery pack of an electric vehicle, the battery module including:
a housing having a length, a width and a height, a first surface of the housing defining a plurality of openings to a plurality of cavities extending along the height of the housing;
a plurality of electrode structures positioned within the plurality of cavities, each electrode structure including a first tab terminal and a second tab terminal; and
a cover having a length equal to the length of the housing, and having a width equal to the width of the housing, the cover disposed over the first surface of the housing, the cover including a plurality of first junction connectors extending along a height of the cover between a first surface of the cover and an opposing second surface of the cover, the plurality of first junction connectors welded to respective first tab terminals of the plurality of electrode structures.

* * * * *